US012732227B2

(12) United States Patent
Yu et al.

(10) Patent No.: US 12,732,227 B2
(45) Date of Patent: Sep. 8, 2026

(54) NEAR FIELD COMMUNICATION NFC APPARATUS AND OPEN-LOOP CONTROL METHOD

(71) Applicant: Huawei Technologies Co., Ltd., Shenzhen (CN)

(72) Inventors: Rui Yu, Singapore (SG); Xuesong Chen, Singapore (SG); Supeng Liu, Singapore (SG); Lei Wang, Singapore (SG); Zhan Yu, Singapore (SG); Thengtee Yeo, Singapore (SG)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 342 days.

(21) Appl. No.: 18/418,693

(22) Filed: Jan. 22, 2024

(65) Prior Publication Data

US 2024/0195454 A1 Jun. 13, 2024

Related U.S. Application Data

(63) Continuation of application No. PCT/CN2021/108291, filed on Jul. 23, 2021.

(51) Int. Cl.
*H04B 5/20* (2024.01)
*H04B 5/24* (2024.01)
*H04B 5/45* (2024.01)

(52) U.S. Cl.
CPC ................. *H04B 5/20* (2024.01); *H04B 5/24* (2024.01); *H04B 5/45* (2024.01)

(58) Field of Classification Search
CPC .... H04B 5/20; H04B 5/24; H04B 5/45; H03L 7/0807; H03L 2207/50; H03L 7/033
USPC ........................................................ 455/41.1
See application file for complete search history.

(56) References Cited

U.S. PATENT DOCUMENTS

| | | | | |
|---|---|---|---|---|
| 8,373,544 | B2 | 2/2013 | Pitt-Pladdy | |
| 10,164,766 | B1 * | 12/2018 | Hung | H03L 7/099 |
| 2014/0218080 | A1 | 8/2014 | Choke et al. | |
| 2022/0069810 | A1 * | 3/2022 | Desai | H03K 3/037 |
| 2022/0393688 | A1 * | 12/2022 | Kundu | H03L 7/12 |

OTHER PUBLICATIONS

Tieng Ying Choke et al., “A 3.4Mbps NFC card emulator supporting 40mm2 loop antenna,” IEEE Radio Frequency Integrated Circuits Symposium (RFIC), 2017, total 4 pages.
Coskun et al.:“A Survey of Near Field Communication (NFC) Technology”Wireless personal communications 71, No. 3, 2013, total 38 pages.
NXP, NFC for embedded applications, Your critical link for the Internet of Things, Aug. 22, 2014, total 20 pages.

* cited by examiner

*Primary Examiner* — Eugene Yun
(74) *Attorney, Agent, or Firm* — Conley Rose, P.C.

(57) ABSTRACT

A near-field communication (NFC) apparatus includes a clock extractor configured to perform clock recovery based on a first carrier signal sent by an NFC card reader to obtain a field clock signal; a digital phase-locked loop configured to perform frequency tracking on the field clock signal to output a first clock signal; a digital baseband chip configured to perform load modulation based on the first clock signal to generate a second carrier signal; and a controller configured to detect a frequency or a phase of the field clock signal, and selectively perform open-loop control on the digital phase-locked loop based on a detection result.

20 Claims, 10 Drawing Sheets

NEAR FIELD COMMUNICATION NFC APPARATUS AND OPEN-LOOP CONTROL METHOD

CROSS-REFERENCE TO RELATED APPLICATIONS

This application is a continuation application of International Patent Application No. PCT/CN2021/108291, filed on Jul. 23, 2021, the disclosure of which is hereby incorporated by reference in its entirety.

TECHNICAL FIELD

This application relates to the field of near-field communication (NFC) technologies, and in particular, to an NFC apparatus and an open-loop control method.

BACKGROUND

An NFC technology is evolved from a combination of contactless radio-frequency identification (RFID) and an interconnection technology. Devices using the NFC technology may exchange data when the devices are close to each other. For example, the NFC technology may be used in an electronic device, for example, a mobile phone, to implement an NFC card-swiping scenario when the device is powered off, as shown in FIG. 1. In the NFC card-swiping scenario when the device is powered off, an NFC card reader 11 may send a carrier signal to a mobile phone 12. The mobile phone 12 may modulate data to the carrier signal through passive load modulation, and radiate, to the NFC card reader 11, the signal on which modulation has been performed. To reduce an antenna area, the mobile phone 12 may alternatively modulate data to the carrier signal through active load modulation. Currently, two manners may be used to provide the carrier signal for the mobile phone 12. A first manner is to provide a signal correspondingly output by a phase-locked loop after the phase-locked loop uses, as a reference clock signal, a clock signal generated by a local clock generator. A second manner is to provide a signal correspondingly output by a phase-locked loop after the phase-locked loop uses, as a reference clock signal, a clock signal recovered from the carrier signal sent by the NFC card reader 11. However, in the first manner, the local clock generator needs to generate the clock signal, and this causes extra power consumption. In the second manner, the recovered field clock signal may be unideal during active load modulation or when a modulation depth of the carrier signal received from the NFC card reader 11 is large, and output of the phase-locked loop is unideal. Consequently, communication between the mobile phone 12 and the NFC card reader 11 is affected.

SUMMARY

In view of the foregoing content, an NFC apparatus and a method are provided, to avoid a case in which a digital phase-locked loop performs a phase tracking operation based on a discontinuous first carrier signal.

According to a first aspect, an embodiment of this application provides an NFC apparatus, where the NFC apparatus includes a clock extractor, configured to perform clock recovery based on a first carrier signal sent by an NFC card reader to obtain a field clock signal; a digital phase-locked loop, configured to perform frequency tracking on the field clock signal to output a first clock signal; and a digital baseband chip, configured to perform load modulation based on the first clock signal to generate a second carrier signal; and a controller, configured to detect a frequency or a phase of the field clock signal, and selectively perform open-loop control on the digital phase-locked loop based on a frequency or phase detection result.

According to the first aspect of this application, the controller detects the frequency or the phase of the field clock signal, and selectively performs open-loop control on the digital phase-locked loop based on the frequency or phase detection result. In this way, the controller can selectively perform open-loop control on the digital phase-locked loop based on a modulation depth of the first carrier signal.

According to some embodiments of this application, the controller is configured to generate a first open-loop control signal if the frequency or the phase of the field clock signal has a deviation, where the first open-loop control signal is used to perform open-loop control on the digital phase-locked loop.

In this application, if the frequency or the phase of the field clock signal has a deviation, the first open-loop control signal is generated to perform open-loop control on the digital phase-locked loop. In this way, open-loop control can be performed on the digital phase-locked loop when the modulation depth of the received first carrier signal is large, to avoid a case in which the digital phase-locked loop performs a phase tracking operation based on a discontinuous first carrier signal.

According to some embodiments of this application, the controller is configured to perform closed-loop control on the digital phase-locked loop if the frequency or the phase of the field clock signal has no deviation.

In this application, if the frequency or the phase of the field clock signal has no deviation, closed-loop control is performed on the digital phase-locked loop. In this way, closed-loop control can be performed on the digital phase-locked loop when the received first carrier signal is continuous, so that the digital phase-locked loop performs the phase tracking operation based on the continuous first carrier signal.

According to some embodiments of this application, the controller is further configured to receive the first clock signal output by the digital phase-locked loop, perform frequency multiplication on the first clock signal to obtain a second clock signal, sample the field clock signal by using the second clock signal, and detect the frequency or the phase of the field clock signal based on a sampling result.

In this application, the field clock signal is sampled after frequency multiplication is performed on the first clock signal output by the digital phase-locked loop, and the frequency or the phase of the field clock signal is detected based on the sampling result. In this way, the frequency or the phase of the field clock signal can be detected.

According to some embodiments of this application, the controller includes a frequency multiplier, a processor, and a digital circuit. The frequency multiplier is configured to perform frequency multiplication on the first clock signal to output the second clock signal. The processor is configured to determine a quantity of high-frequency clocks in the second clock signal, determine the sampling result by using the field clock signal, and detect the frequency or the phase of the field clock signal based on the sampling result, where the sampling result is a quantity of high-frequency clocks in a clock cycle of the field clock signal; and if the quantity of high-frequency clocks in the clock cycle of the field clock signal has a deviation, the frequency or the phase of the field clock signal has a deviation, and the frequency or phase detection result is a first voltage level. The digital circuit is configured to generate the first open-loop control signal based on the frequency or phase detection result of the first voltage level.

In this application, the processor calculates the quantity of high-frequency clocks in the clock cycle of the field clock signal, determines, based on the quantity of high-frequency clocks in the clock cycle of the field clock signal, whether the frequency or the phase of the field clock signal has a deviation, and generates the frequency or phase detection result to the digital circuit. The digital circuit is configured to generate the first open-loop control signal to the digital phase-locked loop based on the frequency or phase detection result of the first voltage level. In this way, the deviation of the frequency or the phase of the field clock signal can be quickly and accurately identified, and the first open-loop control signal can be quickly generated to the digital phase-locked loop.

According to some embodiments of this application, the processor includes a counter and a digital signal processor. The counter is configured to receive the second clock signal, and record the quantity of high-frequency clocks in the second clock signal. The digital signal processor is configured to obtain the quantity of high-frequency clocks from the counter in a current clock cycle of the field clock signal, and determine a quantity of high-frequency clocks in the current clock cycle based on the quantity of high-frequency clocks obtained in the current clock cycle and a quantity of high-frequency clocks obtained in a previous clock cycle.

In this application, the counter records the quantity of high-frequency clocks, and the digital signal processor calculates the quantity of high-frequency clocks in the current clock cycle of the field clock signal based on the field clock signal and the quantity of high-frequency clocks recorded by the counter. In this way, the quantity of high-frequency clocks in the clock cycle of the field clock signal can be calculated quickly and accurately.

According to some embodiments of this application, the digital signal processor is further configured to compare the quantity of high-frequency clocks in the current clock cycle with a preset range to determine whether the quantity of high-frequency clocks in the current clock cycle of the field clock signal has a deviation, and correspondingly determine whether the frequency or the phase of the field clock signal has a deviation. The preset range one-to-one corresponds to the second clock signal. If the quantity of high-frequency clocks in the current clock cycle is not within the preset range, the quantity of high-frequency clocks in the current clock cycle of the field clock signal has a deviation, and the frequency or the phase of the field clock signal has a deviation.

In this application, whether the quantity of high-frequency clocks in the current clock cycle has a deviation is determined based on the quantity of high-frequency clocks in the current clock cycle and the preset range, to generate a corresponding result. In this way, whether the frequency or the phase of the clock signal has a deviation can be determined based on the quantity of high-frequency clocks in the clock cycle of the clock signal.

According to some embodiments of this application, the controller is configured to receive the first carrier signal, detect an amplitude of the first carrier signal, and perform closed-loop control on the digital phase-locked loop if the amplitude of the first carrier signal is greater than a preset value.

In this application, if the amplitude of the first carrier signal is greater than the preset value, closed-loop control is performed on the digital phase-locked loop. In this way, closed-loop control can be performed on the digital phase-locked loop when the modulation depth of the received first carrier signal is normal, and the digital phase-locked loop can be controlled to perform the phase tracking operation based on a continuous first carrier signal.

According to some embodiments of this application, the controller includes an amplitude detection circuit, a delay circuit, and a digital circuit. The amplitude detection circuit is configured to receive the first carrier signal, detect the amplitude of the first carrier signal, and generate an amplitude detection result based on the amplitude of the first carrier signal. If the amplitude of the first carrier signal is greater than the preset value, the amplitude detection result is a second voltage level. The delay circuit is configured to delay the amplitude detection result for preset time to output the amplitude detection result to the digital circuit. The digital circuit is configured to perform closed-loop control on the digital phase-locked loop based on the amplitude detection result of the second voltage level.

In this application, the amplitude detection circuit detects the amplitude of the first carrier signal, the delay circuit delays the amplitude detection result for the preset time for output, and the digital circuit performs closed-loop control on the digital phase-locked loop based on the delayed amplitude detection result. In this way, an interval of a received first carrier signal that is more continuous may be provided, to further avoid a case in which the digital phase-locked loop performs the phase tracking operation based on a discontinuous first carrier signal.

According to some embodiments of this application, the digital phase-locked loop includes a time-to-digital converter, a digital filter, a digitally controlled oscillator, and a frequency divider. The time-to-digital converter and the digital filter are configured to receive the first open-loop control signal, and are configured to stop working based on the first open-loop control signal, and keep a value that is before reception of the first open-loop control signal continuing to be output. The digitally controlled oscillator is configured to keep an oscillation signal that is before an open-loop state continuing to be oscillated to output the first clock signal. The frequency divider is configured to receive the first clock signal, and perform frequency division on the first clock signal, to reduce a frequency of the first clock signal to be equal to or close to the frequency of the field clock signal recovered by the clock extractor.

In this application, the time-to-digital converter and the digital filter stop working based on the first open-loop control signal and keep the value that is before reception of the first open-loop control signal continuing to be output, and the digitally controlled oscillator is configured to keep the oscillation signal that is before the open-loop state continuing to be oscillated. In this way, open-loop control can be performed on the digital phase-locked loop.

According to some embodiments of this application, when load modulation is active load modulation, the digital baseband chip is further configured to generate a second open-loop control signal when outputting the second carrier signal to the NFC card reader. The controller further includes a multiplexer (MUX), where the MUX is configured to selectively perform open-loop control on the digital phase-locked loop based on at least one of the first open-loop control signal and the second open-loop control signal.

In this application, during active load modulation, the digital baseband chip generates the second open-loop control signal to perform open-loop control on the digital phase-locked loop. In this way, open-loop control can be performed on the digital phase-locked loop during active load modulation, to avoid a case in which the digital phase-locked loop performs the phase tracking operation based on a discontinuous first carrier signal. Two cases of active load modulation and a large modulation depth are applied to one circuit by using the MUX. In this way, the same circuit can be used in different cases, thereby reducing an overall size and costs of the circuit.

According to a second aspect, an embodiment of this application further provides an open-loop control method, where the open-loop control method includes a clock extractor of an NFC apparatus that performs clock recovery based on a first carrier signal sent by an NFC card reader to obtain a field clock signal; a digital phase-locked loop of the NFC apparatus performs frequency tracking on the field clock signal to output a first clock signal; a digital baseband chip of the NFC apparatus performs load modulation based on the first clock signal to generate a second carrier signal; and a controller of the NFC apparatus detects a frequency or a phase of the field clock signal and selectively controls the digital phase-locked loop based on a detection result.

According to some embodiments of this application, the open-loop control method further includes generating a first open-loop control signal if the frequency or the phase of the field clock signal has a deviation, where the first open-loop control signal is used to perform open-loop control on the digital phase-locked loop.

According to some embodiments of this application, that the controller detects the frequency or the phase of the field clock signal includes that the controller receives the first clock signal output by the digital phase-locked loop, performs frequency multiplication on the first clock signal to obtain a second clock signal, samples the field clock signal by using the second clock signal, and detects the frequency or the phase of the field clock signal based on a sampling result.

According to some embodiments of this application, that the controller performs frequency multiplication on the first clock signal to obtain the second clock signal, samples the field clock signal by using the second clock signal, and detects the frequency or the phase of the field clock signal based on the sampling result includes forming the controller including a frequency multiplier, a processor, and a digital circuit. The frequency multiplier performs frequency multiplication on the first clock signal to output the second clock signal. The processor determines a quantity of high-frequency clocks in the second clock signal, determines the sampling result by using the field clock signal, and detects the frequency or the phase of the field clock signal based on the sampling result, where the sampling result is a quantity of high-frequency clocks in a clock cycle of the field clock signal. If the quantity of high-frequency clocks in the clock cycle of the field clock signal has a deviation, the frequency or the phase of the field clock signal has a deviation, and the frequency or phase detection result is a first voltage level. The digital circuit generates the first open-loop control signal based on the frequency or phase detection result of the first voltage level.

According to some embodiments of this application, that the processor determines the quantity of high-frequency clocks in the second clock signal, and determines the sampling result by using the field clock signal includes forming the processor including a counter and a digital signal processor. The counter receives the second clock signal, and records the quantity of high-frequency clocks in the second clock signal. The digital signal processor obtains the quantity of high-frequency clocks from the counter in a current clock cycle of the field clock signal, and determines a quantity of high-frequency clocks in the current clock cycle based on the quantity of high-frequency clocks obtained in the current clock cycle and a quantity of high-frequency clocks obtained in a previous clock cycle.

According to some embodiments of this application, that the processor detects the frequency or the phase of the field clock signal based on the sampling result includes that the digital signal processor compares the quantity of high-frequency clocks in the current clock cycle with a preset range to determine whether the quantity of high-frequency clocks in the current clock cycle of the field clock signal has a deviation, and correspondingly determine whether the frequency or the phase of the field clock signal has a deviation. The preset range one-to-one corresponds to the second clock signal. If the quantity of high-frequency clocks in the current clock cycle is not within the preset range, the quantity of high-frequency clocks in the current clock cycle of the field clock signal has a deviation, and the frequency or the phase of the field clock signal has a deviation.

According to some embodiments of this application, the open-loop control method further includes that the controller receives the first carrier signal, detects an amplitude of the first carrier signal, and performs closed-loop control on the digital phase-locked loop if the amplitude of the first carrier signal is greater than a preset value.

According to some embodiments of this application, that the controller detects the amplitude of the first carrier signal, and performs closed-loop control on the digital phase-locked loop if the amplitude of the first carrier signal is greater than the preset value includes forming the controller including an amplitude detection circuit, a delay circuit, and a digital circuit. The amplitude detection circuit receives the first carrier signal, detects the amplitude of the first carrier signal, and generates an amplitude detection result based on the amplitude of the first carrier signal. If the amplitude of the first carrier signal is greater than the preset value, the amplitude detection result is a second voltage level. The delay circuit delays the amplitude detection result for preset time to output the amplitude detection result to the digital circuit. The digital circuit performs closed-loop control on the digital phase-locked loop based on the amplitude detection result of the second voltage level.

According to some embodiments of this application, the open-loop control method further includes, when load modulation is active load modulation, the digital baseband chip of the NFC apparatus generates a second open-loop control signal when outputting the second carrier signal to the NFC card reader; and a MUX of the controller selectively performs open-loop control on the digital phase-locked loop based on at least one of the first open-loop control signal and the second open-loop control signal.

For example, descriptions of the second aspect and various implementations of the second aspect in this application, refer to detailed descriptions of the first aspect and various implementations of the first aspect. In addition, for beneficial effects of the second aspect and various implementations of the second aspect, refer to analysis of beneficial effects of the first aspect and various implementations of the first aspect. Details are not described herein again.

DESCRIPTION OF EMBODIMENTS

The following terms "first" and "second" are merely intended for a purpose of description, and shall not be understood as an indication or implication of relative importance or implicit indication of a quantity of indicated technical features. Therefore, a feature limited by "first" and "second" may explicitly or implicitly include one or more features. In the descriptions of embodiments of this application, a word such as "for example" is used to represent giving an example, an illustration, or a description. Any embodiment or design scheme described as an "example" in embodiments of this application should not be explained as being more preferred or having more advantages than another embodiment or design scheme. Exactly, use of the word "for example" or the like is intended to present a related concept in a manner.

Unless otherwise defined, all technical and scientific terms used in this specification have same meanings as those usually understood by a person skilled in the art of this application. Terms used in this specification of this application are merely for the purpose of describing embodiments, but are not intended to limit this application. It should be understood that in this application, unless otherwise specified, "a plurality of" means two or more.

Figure 1:
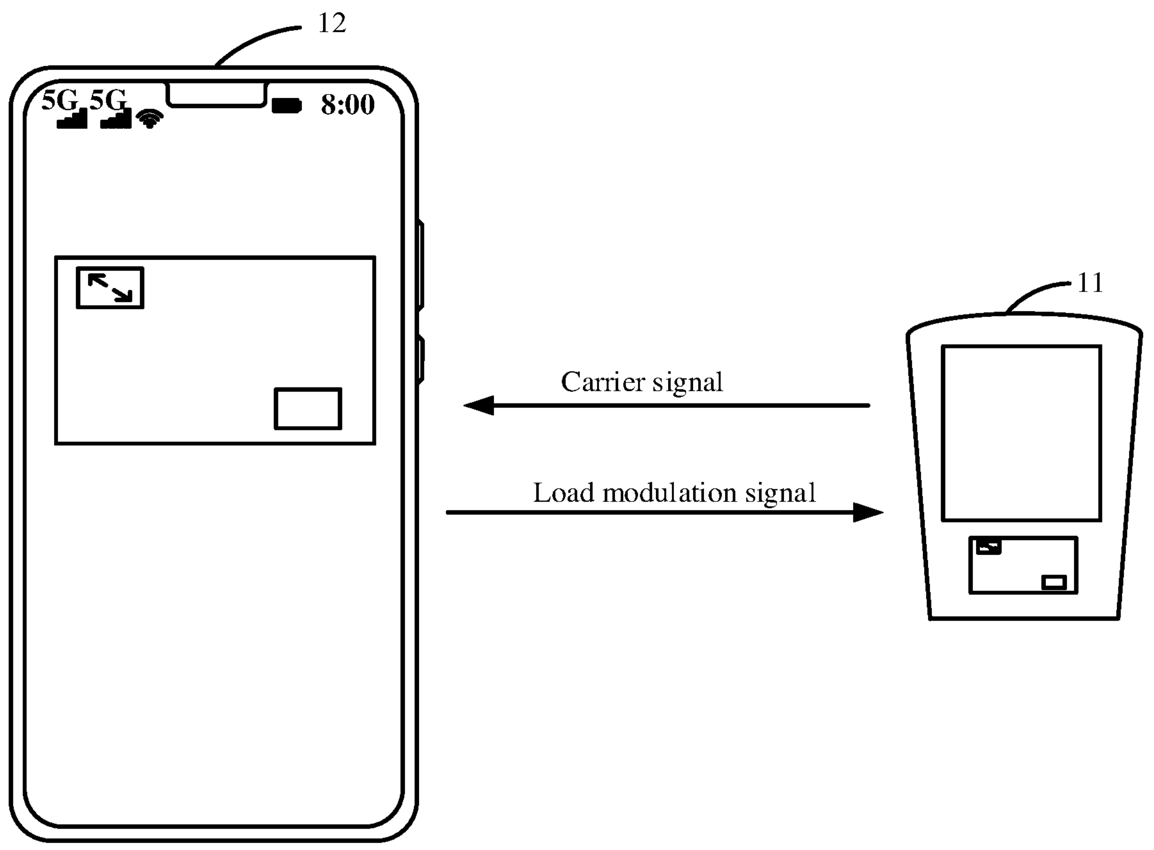
FIG. 1 is a schematic diagram of an existing NFC card-swiping scenario when a device is powered off.
Figure 2:
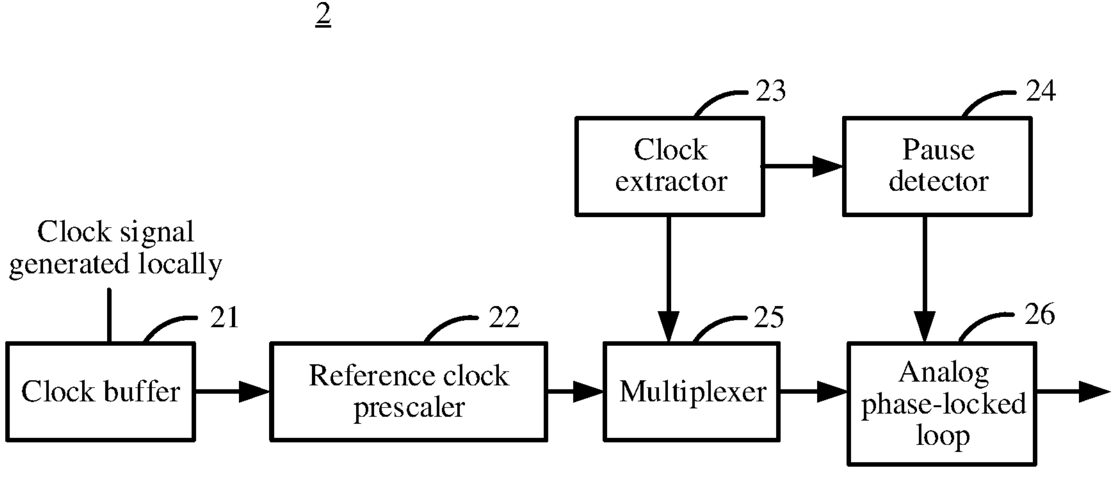
FIG. 2 is a block diagram of an existing phase-locked loop control circuit.
Figure 3:
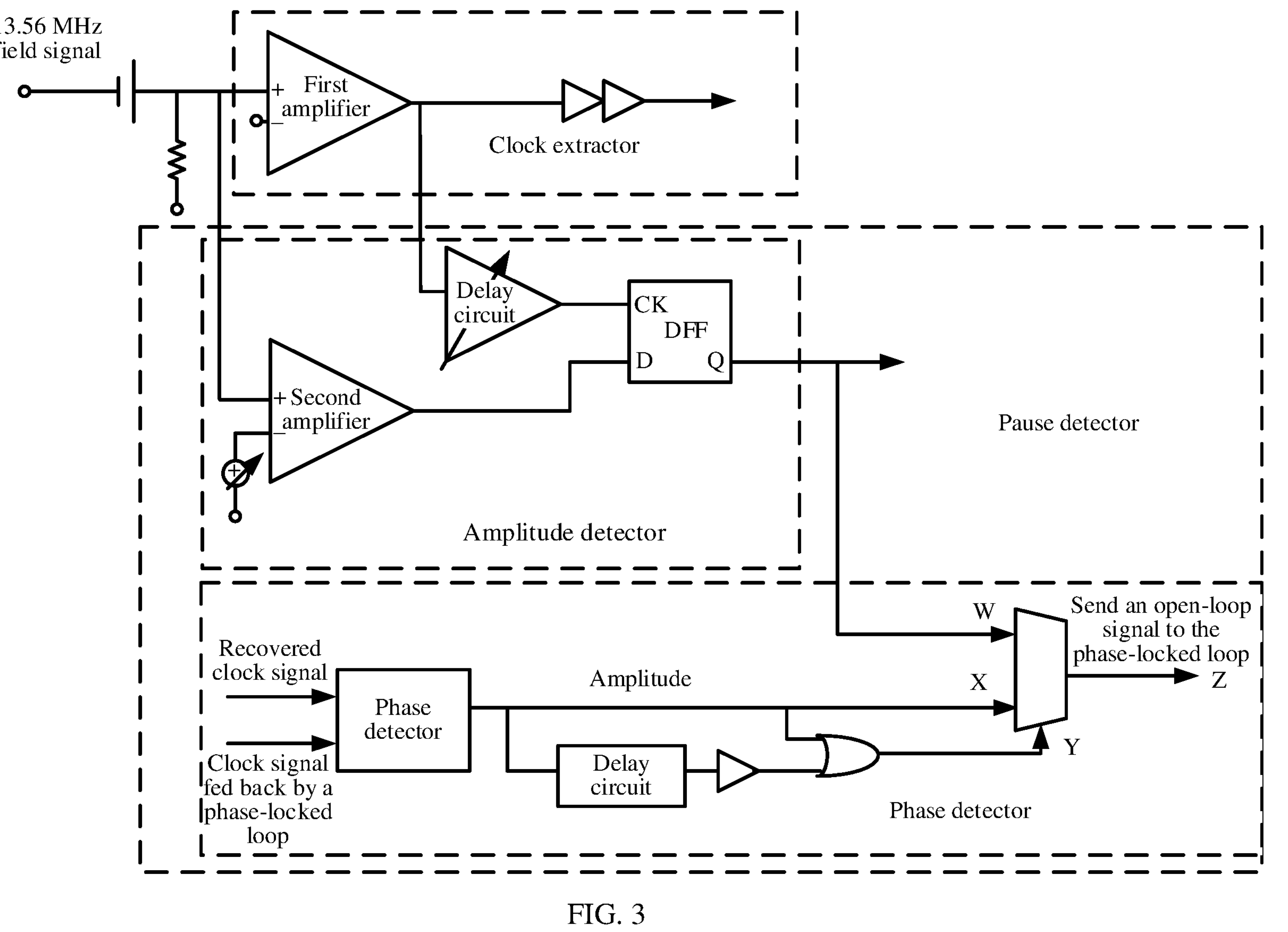
FIG. 3 is a schematic diagram of generating an open-loop signal by a pause detector of an existing phase-locked loop control circuit.

FIG. 2 is a block diagram of an existing phase-locked loop control circuit, and FIG. 3 is a schematic diagram of generating an open-loop signal by a pause detector of the existing phase-locked loop control circuit. The phase-locked loop control circuit 2 may include a clock buffer 21, a reference clock prescaler 22, a clock extractor 23, a pause detector 24, a MUX 25, and an analog phase-locked loop 26. The clock buffer 21 is configured to buffer a clock signal generated by a local clock generator. The clock extractor 23 is configured to recover a clock signal from a received signal. The clock buffer 21 is connected to the MUX 25 by using the reference clock prescaler 22. The clock extractor 23 is connected to the MUX 25. Output of the MUX 25 is connected to the analog phase-locked loop 26. Output of the clock extractor 23 is connected to the pause detector 24. Output of the pause detector 24 is connected to the analog phase-locked loop 26. The pause detector 24 detects, based on the output of the clock extractor 23, an amplitude and a phase difference between the clock signal recovered by the clock extractor and output of the analog phase-locked loop, and outputs a detection signal to the analog phase-locked loop 26 based on the amplitude and the phase difference, to perform open-loop control on the analog phase-locked loop 26. However, because it is difficult to control precision of the analog phase-locked loop 26 in the existing phase-locked loop control circuit 2, an open-loop state easily affects stability of a loop, and establishment of a closed-loop state takes a long time.

Figure 4:
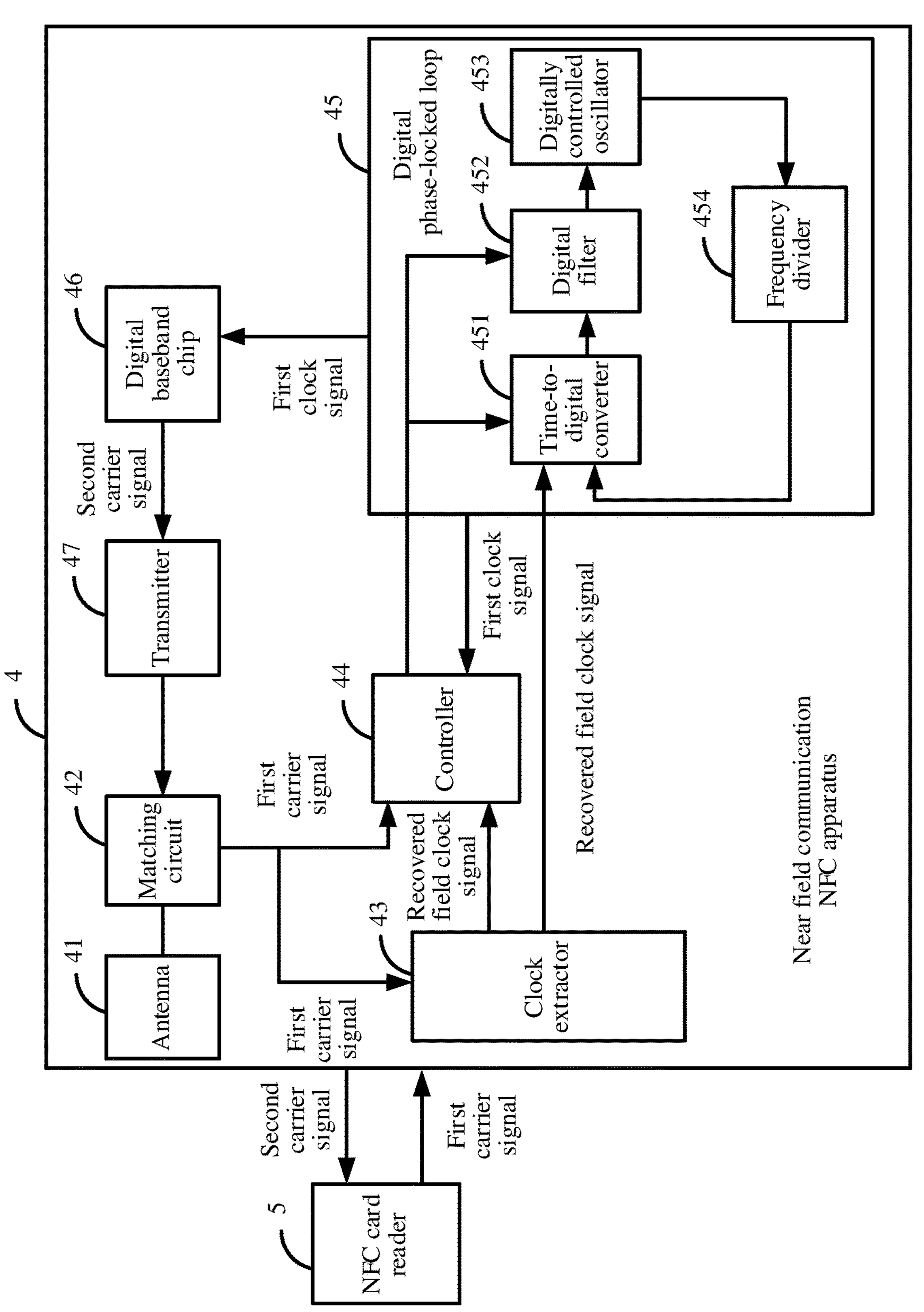
FIG. 4 is a block diagram of an NFC apparatus and an NFC card reader according to a first embodiment of this application.

FIG. 4 is a block diagram of an NFC apparatus and an NFC card reader according to a first embodiment of this application. When the NFC apparatus 4 and the NFC card reader 5 are in a short distance (for example, several centimeters), the NFC card reader 5 sends a first carrier signal (a radio frequency field with a frequency of 13.56 megahertz (MHz)) to the NFC apparatus 4. In response to the first carrier signal, the NFC apparatus 4 transmits, to the NFC card reader 5, a second carrier signal on which load modulation has been performed. The NFC apparatus 4 includes an antenna 41, a matching circuit 42, a clock extractor 43, a controller 44, a digital phase-locked loop 45, a digital baseband chip 46, and a transmitter 47. The antenna 41 may be an antenna that supports radio frequency transmission and reception. The antenna 41 is configured to receive the first carrier signal sent by the NFC card reader 5. The matching circuit 42 is connected to the antenna 41, and is configured to form a resonant circuit with the antenna 41. The clock extractor 43 is connected to the matching circuit 42, and is configured to perform clock recovery based on the first carrier signal sent by the NFC card reader 5 to obtain a field clock signal. The digital phase-locked loop 45 is connected to the clock extractor 43, and is configured to perform frequency tracking on the field clock signal to output a first clock signal. The digital baseband chip 46 is connected to the digital phase-locked loop 45, and is configured to perform load modulation based on the first clock signal to generate the second carrier signal. A frequency divider may be connected between the digital baseband chip 46 and the digital phase-locked loop 45. The frequency divider is configured to perform frequency division on the first clock signal. The digital baseband chip 46 is configured to modulate target data on the first clock signal on which frequency division has been performed, to generate the second carrier signal. It may be understood that the second carrier signal may be generated based on the first clock signal in another manner. This is not limited in this application. The transmitter 47 is connected between the digital baseband chip 46 and the matching circuit 42, and is configured to convert the second carrier signal into a radio frequency signal, and transmit the radio frequency signal to the NFC card reader 5 through the antenna 41. The controller 44 is connected to the digital phase-locked loop 45, and is configured to detect a frequency or a phase of the field clock signal, and selectively perform open-loop control on the digital phase-locked loop 45 based on a detection result. The controller 44 is further configured to generate a first open-loop control signal if the frequency or the phase of the field clock signal has a deviation, where the first open-loop control signal is used to perform open-loop control on the digital phase-locked loop 45. The controller 44 is further configured to perform closed-loop control on the digital phase-locked loop 45 if the frequency or the phase of the field clock signal has no deviation. The controller 44 further receives the first carrier signal, detects an amplitude of the first carrier signal, and performs closed-loop control on the digital phase-locked loop 45 if the amplitude of the first carrier signal is greater than a preset value. In this embodiment, a modulation depth of the first carrier signal may be determined based on the frequency or the phase of the field clock signal. If the frequency or the phase of the field clock signal has a deviation, the modulation depth of the received signal is large; or if the frequency or the phase of the field clock signal has no deviation, the modulation depth of the received signal is normal.

The controller 44 may further receive the first clock signal output by the digital phase-locked loop 45, perform frequency multiplication on the first clock signal to obtain a second clock signal, sample the field clock signal by using the second clock signal, and detect the frequency or the phase of the field clock signal based on a sampling result.

Figure 5:
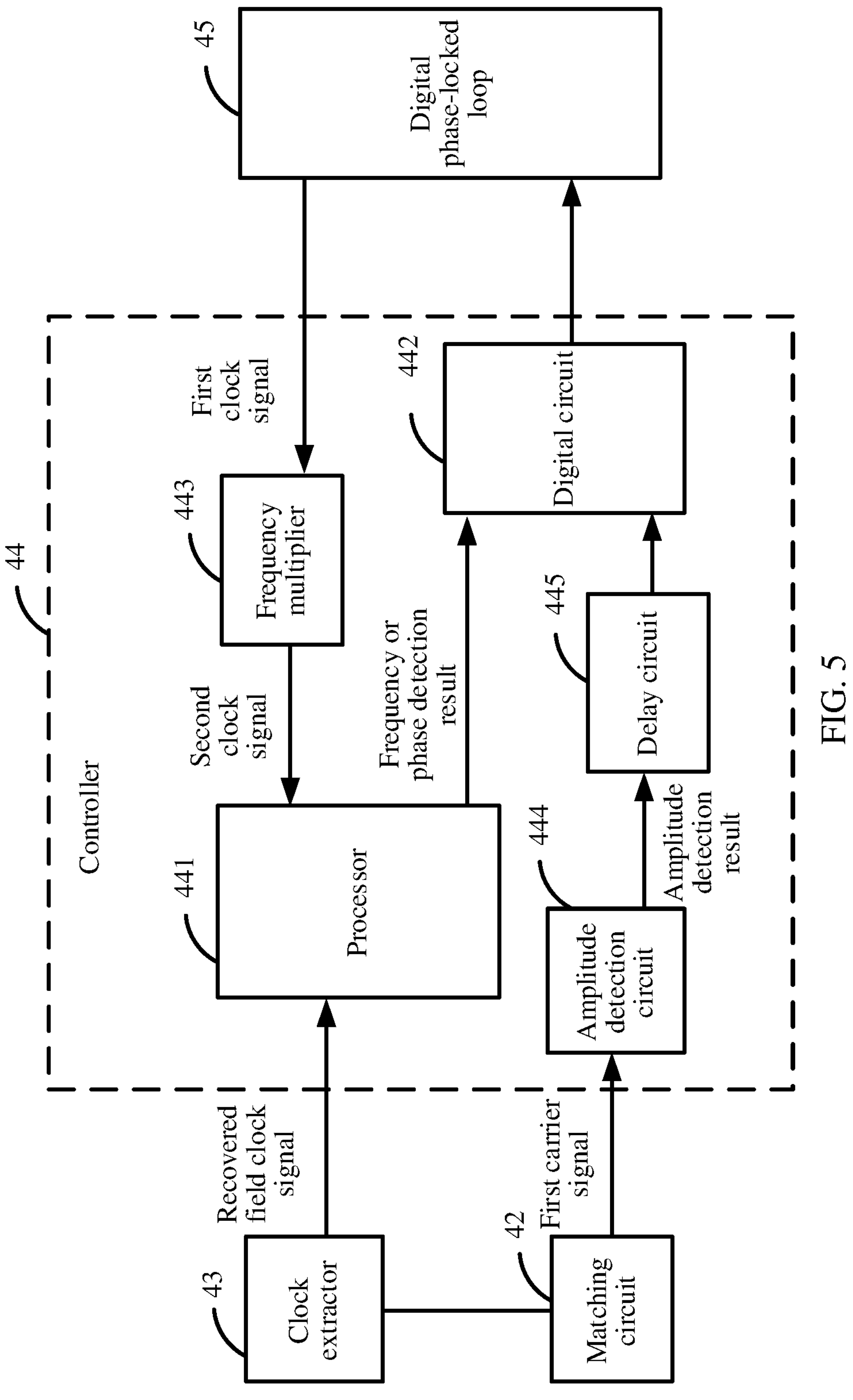
FIG. 5 is a schematic diagram of controlling a digital phase-locked loop by a controller of the NFC apparatus in FIG. 4 based on a first carrier signal.

In an example, FIG. 5 is a schematic diagram of controlling the digital phase-locked loop by the controller of the NFC apparatus based on the first carrier signal. The controller 44 includes a processor 441 and a digital circuit 442. The processor 441 is connected between the clock extractor 43 and the digital circuit 442, and is configured to detect the frequency or the phase of the field clock signal, and generate a voltage level signal to the digital circuit 442 based on the frequency or phase detection result. The digital circuit 442 selectively performs open-loop control on the digital phase-locked loop 45 based on the voltage level signal.

The controller 44 may further include a frequency multiplier 443. The frequency multiplier 443 is connected between the digital phase-locked loop 45 and the processor 441. The frequency multiplier 443 is configured to perform frequency multiplication on the first clock signal to output the second clock signal. In this embodiment, the frequency multiplier 443 multiplies a frequency of the first clock signal, to enable the output second clock signal to be 13.56 MHz×128, that is, 1.7 GHz. It may be understood that the frequency multiplier 443 may further perform other frequency multiplication on the first clock signal, provided that a frequency of the second clock signal output by the frequency multiplier 443 is greater than twice the frequency of the field clock signal. This is not limited in this application. The processor 441 is configured to determine a quantity of high-frequency clocks in the second clock signal, determine the sampling result by using the field clock signal, and detect the frequency or the phase of the field clock signal based on the sampling result, where the sampling result is a quantity of high-frequency clocks in a clock cycle of the field clock signal. If the quantity of high-frequency clocks in the clock cycle of the field clock signal has a deviation, the frequency or the phase of the field clock signal has a deviation, and the frequency or phase detection result is a first voltage level. If the quantity of high-frequency clocks in the clock cycle of the field clock signal has no deviation, the frequency or the phase of the field clock signal has no deviation, and the frequency or phase detection result is a second voltage level. In this embodiment, the first voltage level is a high voltage level, and the second voltage level is a low voltage level. It may be understood that the first voltage level may alternatively be a low voltage level, and the second voltage level may alternatively be a high voltage level. This is not limited in this application. The digital circuit 442 is configured to generate the first open-loop control signal based on the frequency or phase detection result of the first voltage level. The digital circuit 442 is further configured to perform closed-loop control on the digital phase-locked loop 45 based on the frequency or phase detection result of the second voltage level. In this embodiment, the first open-loop control signal is at a high voltage level. It may be understood that the first open-loop control signal may alternatively be at a low voltage level. This is not limited in this application.

Figure 6:
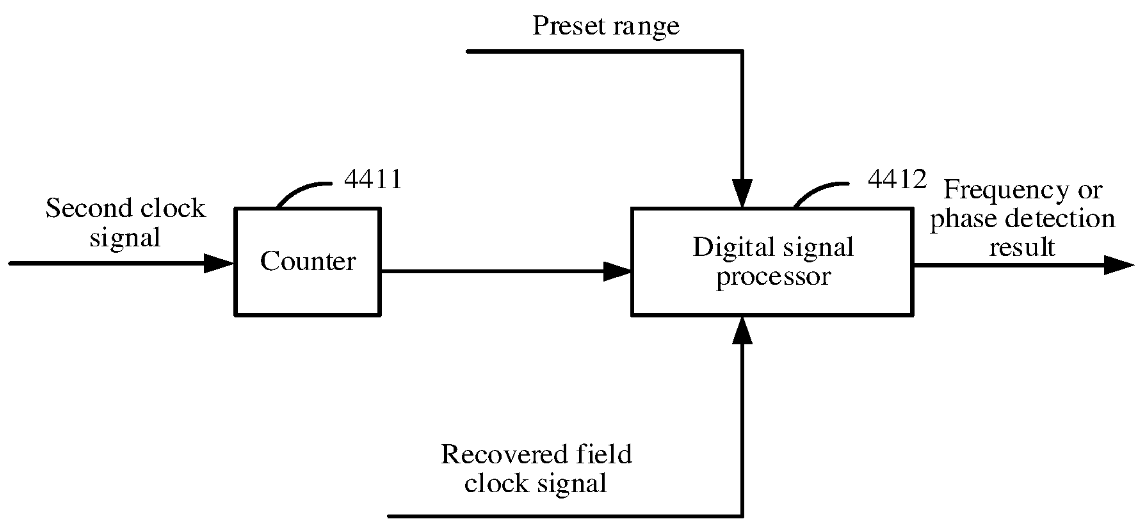
FIG. 6 is a block diagram of a processor of the controller in FIG. 5.

FIG. 6 is a block diagram of the processor of the controller. The processor 441 includes a counter 4411 and a digital signal processor 4412. In this embodiment, the counter 4411 is an 8-bit counter. It may be understood that the counter 4411 may alternatively be another counter. This is not limited in this application. The counter 4411 is connected to the frequency multiplier 443, and is configured to receive the second clock signal, and record the quantity of high-frequency clocks in the second clock signal. The digital signal processor 4412 is connected to the counter 4411 and the clock extractor 43, and is configured to obtain the quantity of high-frequency clocks from the counter 4411 in a current clock cycle of the field clock signal, and determine a quantity of high-frequency clocks in the current clock cycle based on the quantity of high-frequency clocks obtained in the current clock cycle and a quantity of high-frequency clocks obtained in a previous clock cycle. Determining a quantity of high-frequency clocks in the current clock cycle based on the quantity of high-frequency clocks obtained in the current clock cycle and a quantity of high-frequency clocks obtained in a previous clock cycle may include, if the quantity of high-frequency clocks obtained in the current clock cycle is greater than the quantity of high-frequency clocks obtained in the previous clock cycle, determining that the quantity of high-frequency clocks in the current clock cycle is a difference between the quantity of high-frequency clocks obtained in the current clock cycle and the quantity of high-frequency clocks obtained in the previous clock cycle; or if the quantity of high-frequency clocks obtained in the current clock cycle is less than the quantity of high-frequency clocks obtained in the previous clock cycle, determining that the quantity of high-frequency clocks in the current clock cycle is a difference between the quantity of high-frequency clocks obtained in the current clock cycle plus a maximum quantity (for example, 256) counted by the counter 4411 and the quantity of high-frequency clocks obtained in the previous clock cycle. The quantity of high-frequency clocks obtained by the digital signal processor 4412 in the current clock cycle may be obtained at an end moment of the current clock cycle of the field clock signal, and the quantity of high-frequency clocks obtained by the digital signal processor 4412 in the previous clock cycle may be obtained at an end moment of the previous clock cycle of the field clock signal.

The digital signal processor 4412 is further configured to compare the quantity of high-frequency clocks in the current clock cycle with a preset range to determine whether the quantity of high-frequency clocks in the current clock cycle of the field clock signal has a deviation, and correspondingly determine whether the frequency or the phase of the field clock signal has a deviation. The preset range one-to-one corresponds to the second clock signal. In this embodiment, the second clock signal is 13.56 MHz×128, and the preset range may be 127 to 129. It may be understood that the preset range may alternatively be another range or value, for example, 128, and the preset range may further vary with different second clock signals. This is not limited in this application. The preset range may be a range or a value set by a system by default, or a range or a value set by a user based on the second clock signal. If the quantity of high-frequency clocks in the current clock cycle is not within the preset range, the quantity of high-frequency clocks in the current clock cycle of the field clock signal has a deviation, and the frequency or the phase of the field clock signal has a deviation. If the quantity of high-frequency clocks in the current clock cycle is within the preset range, the quantity of high-frequency clocks in the current clock cycle of the field clock signal has no deviation, and the frequency or the phase of the field clock signal has no deviation. The digital signal processor 4412 is connected to the digital circuit 442, and is further configured to output the frequency or phase detection result to the digital circuit 442. The digital circuit 442 may correspondingly and selectively perform open-loop control on the digital phase-locked loop 45.

Still refer to FIG. 4 and FIG. 5. The digital phase-locked loop 45 includes a time-to-digital converter 451, a digital filter 452, a digitally controlled oscillator 453, and a frequency divider 454. The time-to-digital converter 451, the digital filter 452, the digitally controlled oscillator 453, and the frequency divider 454 are connected in sequence. The time-to-digital converter 451 is connected to the clock extractor 43. The time-to-digital converter 451 is configured to receive the field clock signal recovered by the clock extractor 43, and compare the phase of the field clock signal with a phase of a signal output by the frequency divider 454 to output a digital signal. The digital filter 452 is configured to receive the digital signal output by the time-to-digital converter 451, perform a filtering operation on the digital signal, and generate a control signal related to the digital signal. The digitally controlled oscillator 453 is configured to receive the control signal, and output the first clock signal based on the control signal. The frequency divider 454 is configured to receive the first clock signal, and perform frequency division (for example, N times of frequency division) on the first clock signal, to reduce the frequency of the first clock signal to be equal to or close to the frequency of the field clock signal recovered by the clock extractor 43. N may be any proper value. In this embodiment, the frequency multiplier 443 may be connected to the digitally controlled oscillator 453. It may be understood that the frequency multiplier 443 may be further connected to the frequency divider 454, provided that the frequency multiplier 443 can output a preset second clock signal, for example, five times of the frequency 13.56 MHz of the first clock signal. It may be understood that the frequency multiplier 443 may be further located in the digital phase-locked loop 45 and connected to the frequency divider 454 or the digitally controlled oscillator 453, provided that the frequency multiplier 443 can output a preset high-frequency clock. This is not limited in this application.

In this embodiment, the digital circuit 442 is connected to the time-to-digital converter 451 and the digital filter 452. The digital circuit 442 is configured to generate the first open-loop control signal to the time-to-digital converter 451 and the digital filter 452. The time-to-digital converter 451 and the digital filter 452 are configured to receive the first open-loop control signal, and are configured to stop working based on the first open-loop control signal, and keep a value that is before reception of the first open-loop control signal continuing to be output. In this case, the digital phase-locked loop 45 transits to an open-loop state, and the digitally controlled oscillator 453 keeps an oscillation signal that is before the open-loop state continuing to be oscillated to output the first clock signal. The digital circuit 442 may further control the time-to-digital converter 451 and the digital filter 452 to continue to work, and control the digital phase-locked loop 45 to continue to perform a phase tracking operation.

Figure 7:
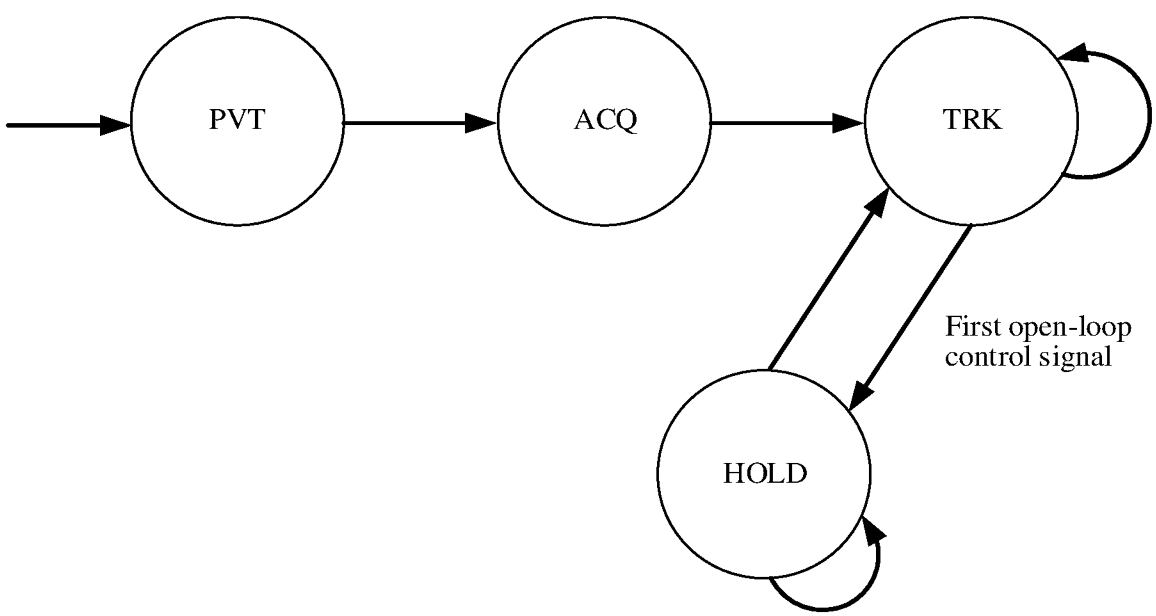
FIG. 7 is a state transition diagram of a digital phase-locked loop of the NFC apparatus in FIG. 4.

FIG. 7 is a state transition diagram of the digital phase-locked loop of the NFC apparatus. The digital phase-locked loop 45 includes four states: a process voltage temperature (PVT) calibration state, an acquisition (ACQ) state, a phase tracking (TRK) state, and a hold state. The TRK state represents a closed-loop state, and the hold state represents an open-loop state. The PVT calibration state, the ACQ state, and the TRK state are entered in sequence. In the PVT calibration state, an arrow pointing to the PVT calibration state indicates that PVT calibration is performed when a reset signal is received or the NFC apparatus 4 is turned on. An arrow pointing from the TRK state to the TRK state indicates to keep in the TRK state. An arrow pointing from the TRK state to the hold state indicates that if the first open-loop control signal is received in the TRK state, the digital phase-locked loop transits from the TRK state to the hold state. An arrow pointing from the hold state to the hold state indicates to keep in the hold state. An arrow pointing from the hold state to the TRK state indicates that if the digital phase-locked loop 45 is a closed loop in the hold state, the digital phase-locked loop 45 transits from the hold state to the TRK state.

Still referring to FIG. 4, FIG. 5, and FIG. 6, the controller 44 may further include an amplitude detection circuit 444. The amplitude detection circuit 444 is further connected to the matching circuit 42 and the digital circuit 442, and is configured to receive the first carrier signal, detect the amplitude of the first carrier signal, and generate an amplitude detection result to the digital circuit 442 based on the amplitude of the first carrier signal. If the amplitude of the first carrier signal is less than or equal to the preset value, the amplitude detection result is the first voltage level. If the amplitude detection result is the first voltage level, the digital phase-locked loop 45 is in the open-loop state. If the amplitude of the first carrier signal is greater than the preset value, the amplitude detection result is the second voltage level.

The controller 44 may further include a delay circuit 445. The amplitude detection circuit 444 may further be connected to the digital circuit 442 through the delay circuit 445. Optionally, the delay circuit 445 may alternatively be disposed in the amplitude detection circuit 444. The delay circuit 445 is configured to delay the amplitude detection result for preset time to output the amplitude detection result to the digital circuit 442. The digital circuit 442 is further configured to perform closed-loop control on the digital phase-locked loop 45 based on the amplitude detection result of the second voltage level.

Figure 8:
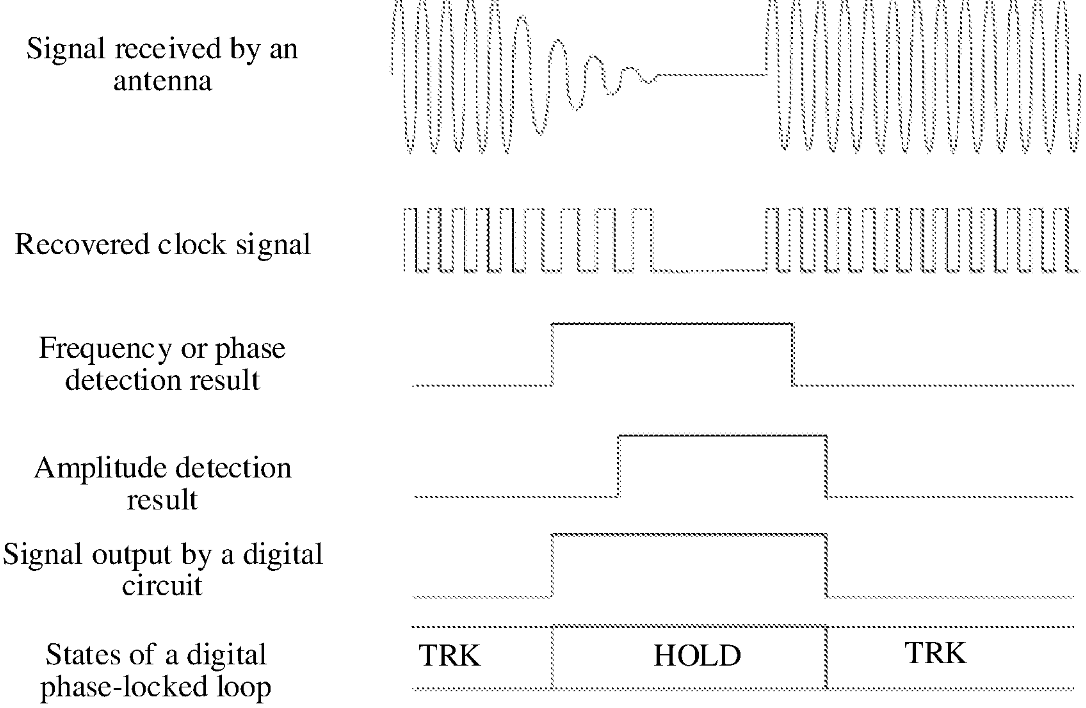
FIG. 8 is a working sequence diagram of the NFC apparatus in FIG. 4.

FIG. 8 is a working sequence diagram of the NFC apparatus. FIG. 8 shows working states of the digital phase-locked loop 45 during transition between the TRK state and the hold state when the first carrier signal of the NFC card reader 5 received by the antenna 41 is discontinuous due to a large modulation depth. In FIG. 8, the antenna 41 starts to receive a continuous first carrier signal of the NFC card reader 5. In this case, the field clock signal recovered by the clock extractor 43 is stable, and the digital signal processor 4412 of the processor 441 determines that the frequency or the phase of the recovered field clock signal has no deviation, and outputs the frequency or phase detection result of the second voltage level (low voltage level). If the amplitude detection circuit 444 also determines that the amplitude of the first carrier signal of the NFC card reader 5 received by the antenna 41 is greater than the preset value, the amplitude detection circuit 444 delays the amplitude detection result of the second voltage level (low voltage level) for the preset time for output. The digital circuit 442 controls, based on the frequency or phase detection result of the second voltage level and the amplitude detection result of the second voltage level, the digital phase-locked loop 45 to keep in the TRK state or enter the TRK state.

If the first carrier signal of the NFC card reader 5 received by the antenna 41 changes from a continuous signal to a discontinuous signal, the field clock signal recovered by the clock extractor 43 is unstable, and the digital signal processor 4412 of the processor 441 determines that the frequency or the phase of the recovered field clock signal has a deviation, and outputs the frequency or phase detection result of the first voltage level (high voltage level). The digital circuit 442 outputs the first open-loop control signal at the first voltage level (high voltage level) based on the frequency or phase detection result of the first voltage level. Open-loop control is performed on the digital phase-locked loop 45 based on the first open-loop control signal. The digital phase-locked loop 45 transits from the TRK state to the hold state. In this case, if the amplitude detection circuit 444 also determines that the amplitude of the first carrier signal of the NFC card reader 5 received by the antenna 41 is less than the preset value, the amplitude detection circuit 444 delays the amplitude detection result of the first voltage level (high voltage level) for the preset time for output.

If the first carrier signal of the NFC card reader 5 received by the antenna 41 changes from a discontinuous signal to a continuous signal, the field clock signal recovered by the clock extractor 43 is stable. If the amplitude detection circuit 444 determines that the amplitude of the first carrier signal of the NFC card reader 5 received by the antenna 41 is greater than the preset value, the amplitude detection circuit 444 delays the amplitude detection result of the second voltage level (low voltage level) for the preset time for output. The digital circuit 442 controls, based on the amplitude detection result of the second voltage level, the digital phase-locked loop 45 to enter the TRK state from the hold state. When the field clock signal is switched to a stable state, the digital signal processor 4412 of the processor 441 also determines that the frequency or the phase of the recovered field clock signal has no deviation, and outputs the frequency or phase detection result of the second voltage level (low voltage level).

Therefore, in this application, the first open-loop control signal may be generated when the frequency or phase detection result of the first voltage level (high voltage level) is received, and the digital phase-locked loop 45 is controlled to transit from the TRK state to the hold state. The digital phase-locked loop 45 is controlled to transit from the hold state to the TRK state when the amplitude detection result of the second voltage level (low voltage level) is received.

It may be understood that, the state of the digital phase-locked loop 45 controlled by the NFC apparatus 4 based on the frequency or phase detection result and the amplitude detection result may further have another variation. For example, the digital signal processor 4412 is connected to the digital circuit 442 through the delay circuit 445, or the delay circuit 445 is disposed in the digital signal processor 4412, and the amplitude detection circuit 444 is not connected to the digital circuit 442 through the delay circuit 445. In this case, the first open-loop control signal is generated when the amplitude detection result of the first voltage level (high voltage level) is received, and the digital phase-locked loop 45 is controlled to transit from the TRK state to the hold state. When the frequency or phase detection result of the second voltage level (low voltage level) is received, the digital phase-locked loop 45 is controlled to transit from the hold state to the TRK state. This is not limited in this application.

In this embodiment, the controller 44 detects the frequency or the phase of the field clock signal, and selectively performs open-loop control on the digital phase-locked loop 45 based on the frequency or phase detection result. In this way, the controller 44 can selectively perform open-loop control on the digital phase-locked loop 45 based on the modulation depth of the first carrier signal. If the frequency or the phase of the field clock signal has a deviation, the first open-loop control signal is generated to perform open-loop control on the digital phase-locked loop 45. In this way, open-loop control can be performed on the digital phase-locked loop 45 when the modulation depth of the received first carrier signal is large, to avoid a case in which the digital phase-locked loop 45 performs a phase tracking operation based on a discontinuous first carrier signal. If the frequency or the phase of the field clock signal has no deviation, closed-loop control is performed on the digital phase-locked loop 45. In this way, closed-loop control can be performed on the digital phase-locked loop 45 when the received first carrier signal is continuous, so that the digital phase-locked loop 45 performs a phase tracking operation based on the continuous first carrier signal. The field clock signal is sampled after frequency multiplication is performed on the first clock signal output by the digital phase-locked loop 45, and the frequency or the phase of the field clock signal is detected based on the sampling result. In this way, the frequency or the phase of the field clock signal can be detected. The controller 44 includes the processor 441, the digital circuit 442, and the frequency multiplier 443. The processor 441 is configured to calculate the quantity of high-frequency clocks in the clock cycle of the field clock signal, determine, based on the quantity of high-frequency clocks in the clock cycle of the field clock signal, whether the frequency or the phase of the field clock signal has a deviation, and generate the frequency or phase detection result to the digital circuit 442. The digital circuit 442 is configured to generate the first open-loop control signal to the digital phase-locked loop 45 based on the frequency or phase detection result of the first voltage level. In this way, the deviation of the frequency or the phase of the field clock signal can be quickly and accurately identified, and the first open-loop control signal can be quickly generated to the digital phase-locked loop 45. The processor 441 includes the counter 4411 and the digital signal processor 4412. The counter 4411 may record the quantity of high-frequency clocks, and the digital signal processor 4412 calculates the quantity of high-frequency clocks in the current clock cycle of the field clock signal based on the quantity of high-frequency clocks recorded by the counter 4411 and the field clock signal. In this way, the quantity of high-frequency clocks in the clock cycle of the field clock signal can be calculated quickly and accurately. The first open-loop control signal is generated to the time-to-digital converter 451 and the digital filter 452. In this way, open-loop control can be performed on the digital phase-locked loop 45, and no additional component needs to be added, to reduce costs. If the amplitude of the first carrier signal is greater than the preset value, closed-loop control is performed on the digital phase-locked loop 45. In this way, closed-loop control can be performed on the digital phase-locked loop 45 when the modulation depth of the received first carrier signal is normal, and the digital phase-locked loop 45 can be controlled to perform a phase tracking operation based on a continuous first carrier signal. The amplitude detection circuit 444 detects the amplitude of the first carrier signal, the delay circuit 445 delays the amplitude detection result for the preset time for output, and the digital circuit 442 performs closed-loop control on the digital phase-locked loop 45 based on the delayed amplitude detection result. In this way, an interval of a received first carrier signal that is more continuous can be provided, and a case in which the digital phase-locked loop 45 performs a phase tracking operation based on a discontinuous first carrier signal can be avoided.

Figure 9:
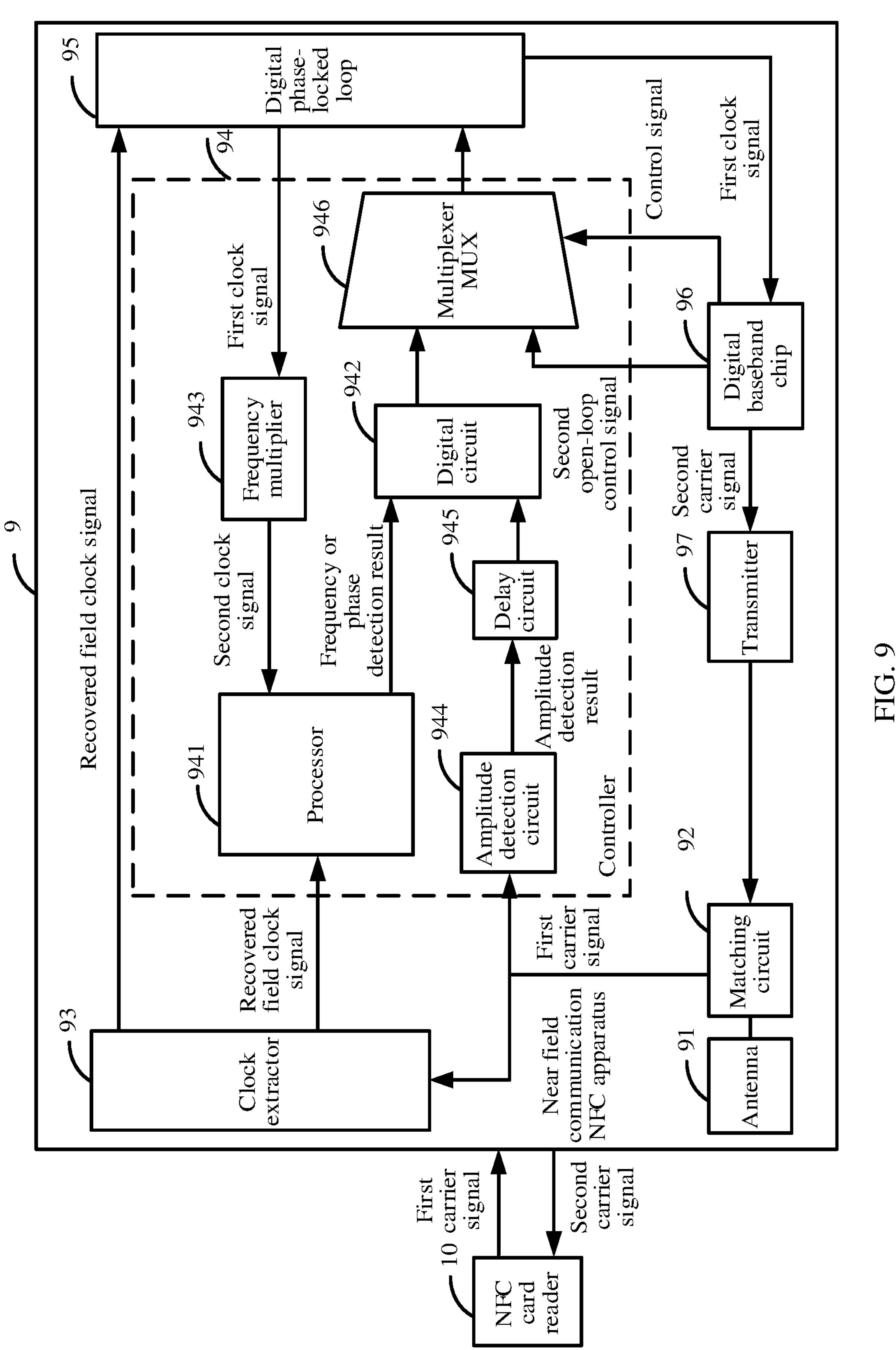
FIG. 9 is a block diagram of an NFC apparatus and an NFC card reader according to a second embodiment of this application.

FIG. 9 is a block diagram of an NFC apparatus and an NFC card reader according to a second embodiment of this application. The NFC apparatus 9 in the second embodiment is similar to the NFC apparatus in the first embodiment. The NFC apparatus 9 in the second embodiment communicates with the NFC card reader 10. The NFC apparatus 9 includes an antenna 91, a matching circuit 92, a clock extractor 93, a controller 94, a digital phase-locked loop 95, a digital baseband chip 96, and a transmitter 97. Connection relationships and functions among the antenna 91, the matching circuit 92, the clock extractor 93, the digital phase-locked loop 95, the digital baseband chip 96, and the transmitter 97 in the second embodiment are the same as connection relationships and functions among the antenna, the matching circuit, the clock extractor, the digital phase-locked loop, the digital baseband chip, and the transmitter in the first embodiment. The controller 94 in the second embodiment also includes a processor 941, a digital circuit 942, a frequency multiplier 943, an amplitude detection circuit 944, and a delay circuit 945. A difference lies in the following.

When load modulation is active load modulation, the digital baseband chip 96 of the NFC apparatus 9 generates a second open-loop control signal when outputting a second carrier signal to the NFC card reader 10. The controller 94 further includes a MUX 946. The MUX 946 is configured to selectively perform open-loop control on the digital phase-locked loop 95 based on at least one of a first open-loop control signal and the second open-loop control signal. The MUX 946 includes an input end, a control end, and an output end. The input end of the MUX 946 is connected to the digital baseband chip 96 and the digital circuit 942 of the controller 94, and is configured to receive the first open-loop control signal and the second open-loop control signal. The control end of the MUX 946 is connected to the digital baseband chip 96, and is configured to receive a control signal of the digital baseband chip 96. The output end of the MUX 946 is connected to the digital phase-locked loop 95. The MUX 946 determines, based on the control signal of the digital baseband chip 96, to connect the digital baseband chip 96 or the digital circuit 942. When load modulation is active load modulation, the digital baseband chip 96 outputs a first control signal to the MUX 946 to control the MUX 946 to connect the digital baseband chip 96. The digital baseband chip 96 may output the second open-loop control signal by using the MUX 946 to perform open-loop control on the digital phase-locked loop 95. When load modulation is passive load modulation, the digital baseband chip 96 further outputs a second control signal to the MUX 946 to control the MUX 946 to connect the digital circuit 942. The digital circuit 942 may output the first open-loop control signal by using the MUX 946 to perform open-loop control on the digital phase-locked loop 95.

Figure 10:
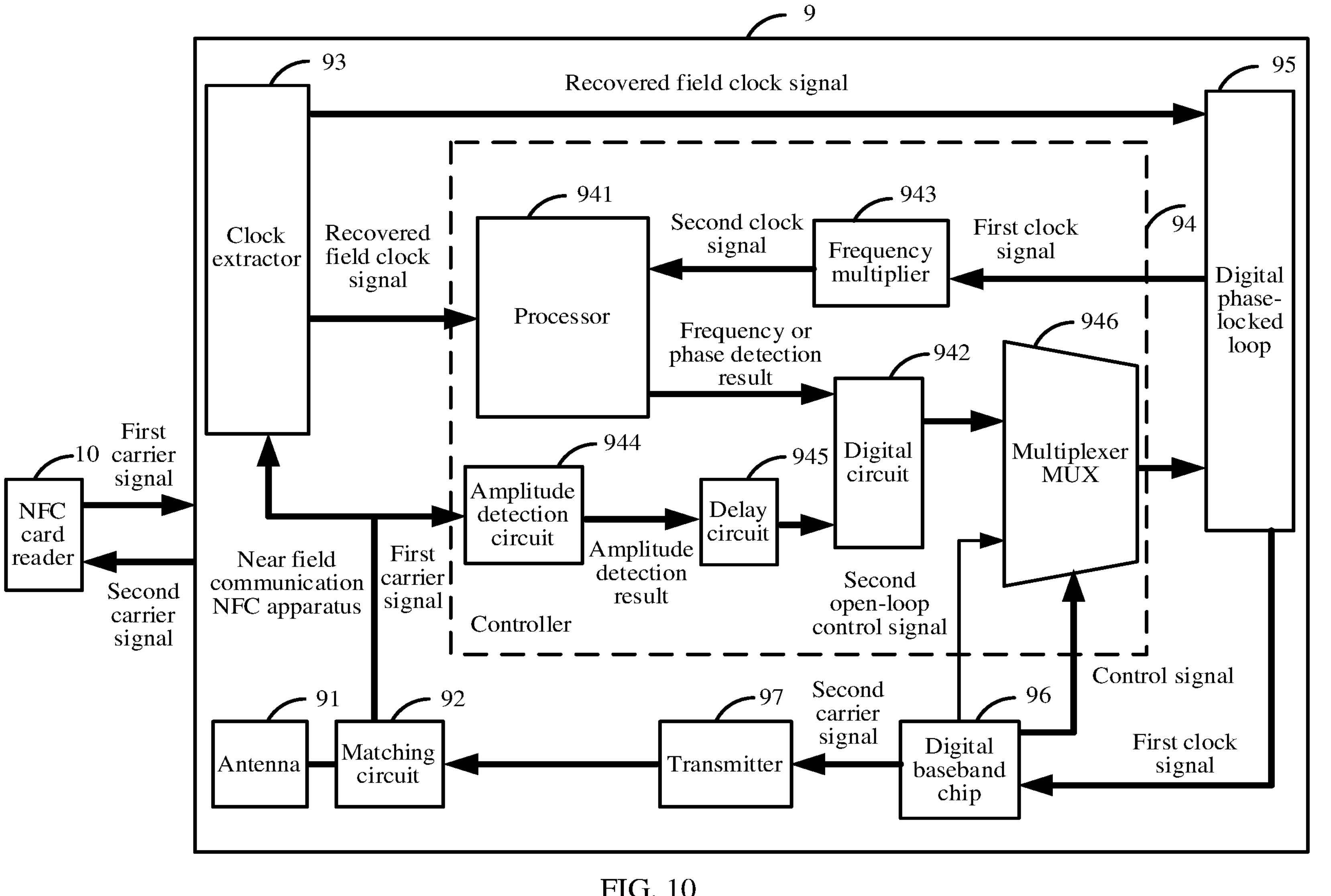
FIG. 10 is a block diagram of an NFC apparatus and an NFC card reader according to a second embodiment of this application, where thick lines show a working process of the NFC apparatus when a modulation depth of a received first carrier signal is large.

Also refer to FIG. 10. Thick lines in FIG. 10 show a working process of the NFC apparatus when a modulation depth of a received first carrier signal is large. The working process of the NFC apparatus 9 when the modulation depth of the received first carrier signal is large is similar to the working process of the NFC apparatus in the first embodiment, and a difference lies in that the digital circuit 942 is connected to the digital phase-locked loop 95 by using the MUX 946. The digital circuit 942 outputs the first open-loop control signal by using the MUX 946 to perform open-loop control on the digital phase-locked loop 95, and performs closed-loop control on the digital phase-locked loop 95 by using the MUX 946.

Figure 11:
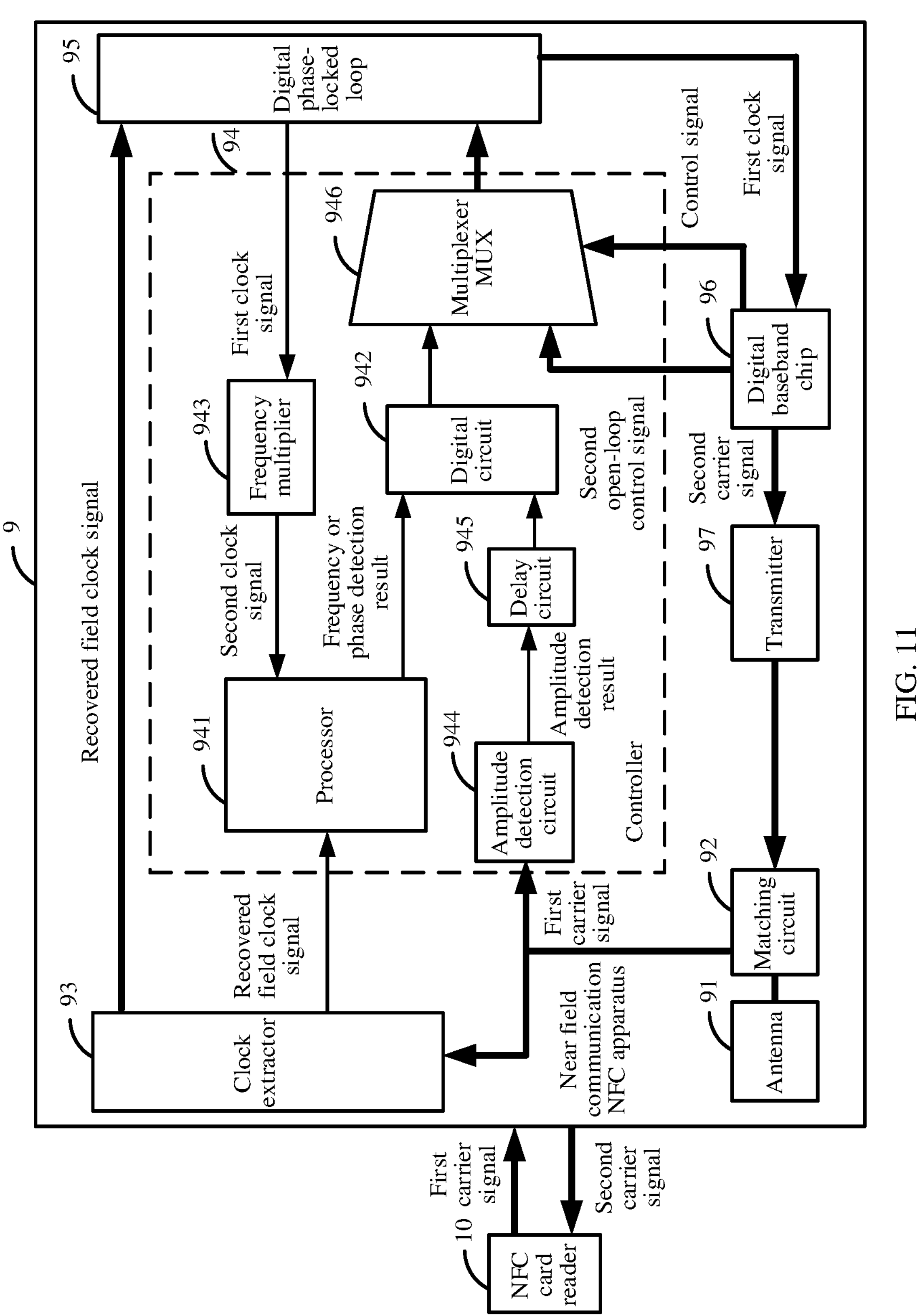
FIG. 11 is a block diagram of an NFC apparatus and an NFC card reader according to a second embodiment of this application, where thick lines show a working process of the NFC apparatus during active load modulation.

Also refer to FIG. 11. Thick lines in FIG. 11 show a working process of the NFC apparatus during active load modulation. In FIG. 11, the antenna 91 may be an antenna that supports radio frequency transmission and reception. The antenna 91 is configured to receive the first carrier signal sent by the NFC card reader 10. The matching circuit 92 is connected to the antenna 91, and is configured to form a resonant circuit with the antenna 91. The clock extractor 93 is connected to the matching circuit 92, and is configured to perform clock recovery based on the first carrier signal sent by the NFC card reader 10 to obtain a field clock signal. The digital phase-locked loop 95 is connected to the clock extractor 93, and is configured to perform frequency tracking on the field clock signal to output a first clock signal. The digital baseband chip 96 is connected to the digital phase-locked loop 95, and is configured to perform load modulation based on the first clock signal to generate the second carrier signal. A frequency divider may be connected between the digital baseband chip 96 and the digital phase-locked loop 95. The frequency divider is configured to perform frequency division on the first clock signal. The digital baseband chip 96 is configured to modulate target data on the first clock signal on which frequency division has been performed, to generate the second carrier signal. It may be understood that the second carrier signal may be generated based on the first clock signal in another manner. This is not limited in this application. The transmitter 97 is connected between the digital baseband chip 96 and the matching circuit 92, and is configured to convert the second carrier signal into a radio frequency signal, and transmit the radio frequency signal to the NFC card reader 10 through the antenna 91. The digital baseband chip 96 may be connected to the digital phase-locked loop 95 by using the MUX 946, and is configured to output the second open-loop control signal to the digital phase-locked loop 95 by using the MUX 946, to perform open-loop control on the digital phase-locked loop 95. A cycle for the digital baseband chip 96 to output the second open-loop control signal is related to time for the digital baseband chip 96 to output the second carrier signal. The digital baseband chip 96 generates the cycle of the second open-loop control signal based on a cycle of the second carrier signal, so that the digital baseband chip 96 can set several cycles of the digital phase-locked loop 95 to be open-loop states.

In this embodiment, during active load modulation, the digital baseband chip 96 generates the second open-loop control signal to perform open-loop control on the digital phase-locked loop 95. In this way, open-loop control can be performed on the digital phase-locked loop 95 during active load modulation, to avoid a case in which the digital phase-locked loop 95 performs a phase tracking operation based on a discontinuous first carrier signal. Two cases of active load modulation and a large modulation depth are applied to one circuit by using the MUX 946. In this way, the same circuit can be used in different cases, thereby reducing an overall size and costs of the circuit.

Figure 12:
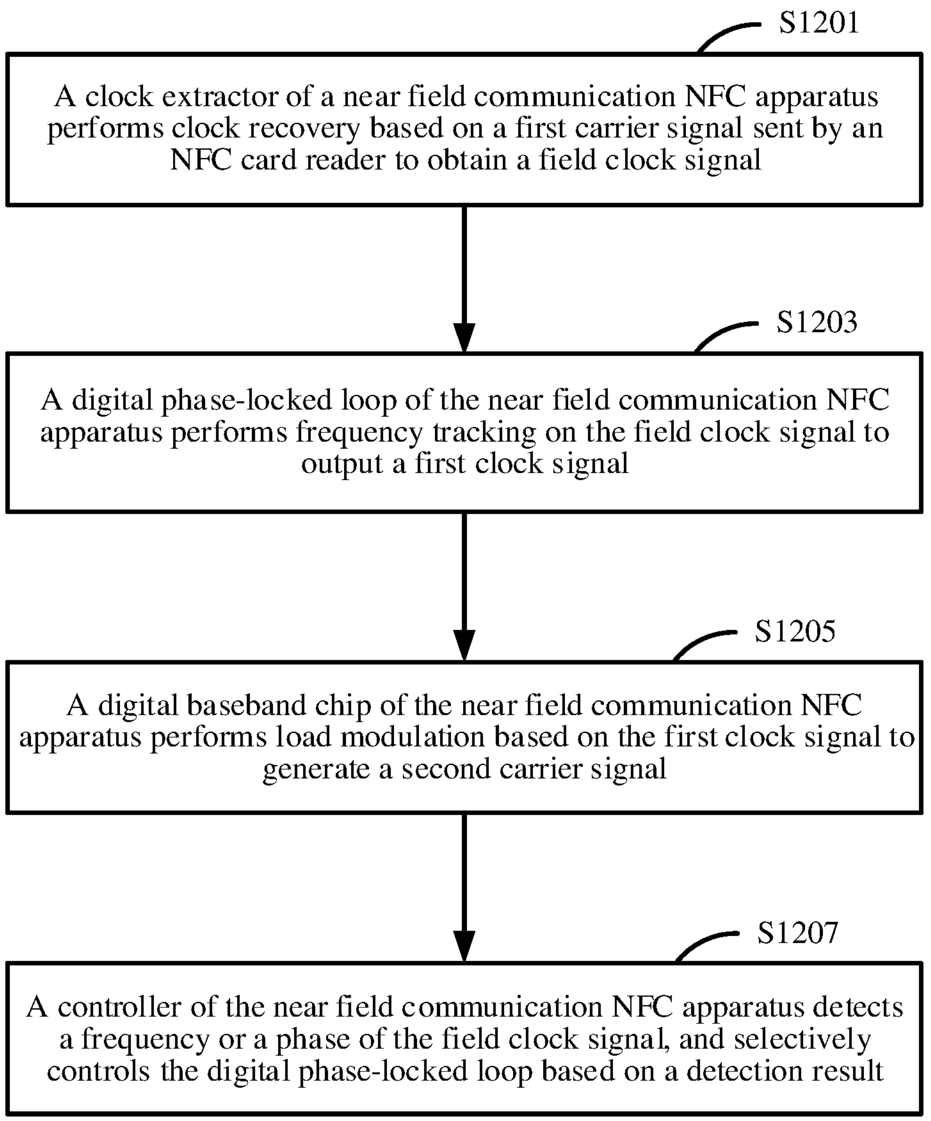
FIG. 12 is a flowchart of an open-loop control method according to an embodiment of this application.

FIG. 12 is a flowchart of an open-loop control method according to an embodiment of this application. The open-loop control method is applied to an NFC apparatus. The open-loop control method includes the following steps.

S1201: A clock extractor of the NFC apparatus performs clock recovery based on a first carrier signal sent by an NFC card reader to obtain a field clock signal.

S1203: A digital phase-locked loop of the NFC apparatus performs frequency tracking on the field clock signal to output a first clock signal.

S1205: A digital baseband chip of the NFC apparatus performs load modulation based on the first clock signal to generate a second carrier signal.

S1207: A controller of the NFC apparatus detects a frequency or a phase of the field clock signal, and selectively controls the digital phase-locked loop based on a detection result.

In this embodiment, the open-loop control method further includes generating a first open-loop control signal if the frequency or the phase of the field clock signal has a deviation, where the first open-loop control signal is used to perform open-loop control on the digital phase-locked loop.

In this embodiment, the open-loop control method further includes performing closed-loop control on the digital phase-locked loop if the frequency or the phase of the field clock signal has no deviation.

In this embodiment, that the controller detects the frequency or the phase of the field clock signal includes that the controller receives the first clock signal output by the digital phase-locked loop, performs frequency multiplication on the first clock signal to obtain a second clock signal, samples the field clock signal by using the second clock signal, and detects the frequency or the phase of the field clock signal based on a sampling result.

In this embodiment, that the controller performs frequency multiplication on the first clock signal to obtain the second clock signal, samples the field clock signal by using the second clock signal, and detects the frequency or the phase of the field clock signal based on the sampling result includes forming the controller including a frequency multiplier, a processor, and a digital circuit.

The frequency multiplier performs frequency multiplication on the first clock signal to output the second clock signal.

The processor determines a quantity of high-frequency clocks in the second clock signal, determines the sampling result by using the field clock signal, and detects the frequency or the phase of the field clock signal based on the sampling result. The sampling result is a quantity of high-frequency clocks in a clock cycle of the field clock signal. If the quantity of high-frequency clocks in the clock cycle of the field clock signal has a deviation, the frequency or the phase of the field clock signal has a deviation, and the frequency or phase detection result is a first voltage level.

The digital circuit generates the first open-loop control signal based on the frequency or phase detection result of the first voltage level.

In this embodiment, that the processor determines the quantity of high-frequency clocks in the second clock signal, and determines the sampling result by using the field clock signal includes forming the processor including a counter and a digital signal processor.

The counter receives the second clock signal, and records the quantity of high-frequency clocks in the second clock signal.

The digital signal processor obtains the quantity of high-frequency clocks from the counter in a current clock cycle of the field clock signal, and determines a quantity of high-frequency clocks in the current clock cycle based on the quantity of high-frequency clocks obtained in the current clock cycle and a quantity of high-frequency clocks obtained in a previous clock cycle.

In this embodiment, that the processor detects the frequency or the phase of the field clock signal based on the sampling result includes that the digital signal processor compares the quantity of high-frequency clocks in the current clock cycle with a preset range to determine whether the quantity of high-frequency clocks in the current clock cycle of the field clock signal has a deviation, and correspondingly determine whether the frequency or the phase of the field clock signal has a deviation. The preset range one-to-one corresponds to the second clock signal. If the quantity of high-frequency clocks in the current clock cycle is not within the preset range, the quantity of high-frequency clocks in the current clock cycle of the field clock signal has a deviation, and the frequency or the phase of the field clock signal has a deviation.

In this embodiment, the open-loop control method further includes that the controller receives the first carrier signal, detects an amplitude of the first carrier signal, and performs closed-loop control on the digital phase-locked loop if the amplitude of the first carrier signal is greater than a preset value.

In this embodiment, that the controller detects the amplitude of the first carrier signal, and performs closed-loop control on the digital phase-locked loop if the amplitude of the first carrier signal is greater than the preset value includes forming the controller including an amplitude detection circuit, a delay circuit, and the digital circuit.

The amplitude detection circuit receives the first carrier signal, detects the amplitude of the first carrier signal, and generates an amplitude detection result based on the amplitude of the first carrier signal. If the amplitude of the first carrier signal is greater than the preset value, the amplitude detection result is a second voltage level.

The delay circuit delays the amplitude detection result for preset time to output the amplitude detection result to the digital circuit.

The digital circuit performs closed-loop control on the digital phase-locked loop based on the amplitude detection result of the second voltage level.

In this embodiment, the open-loop control method further includes forming the digital phase-locked loop including a time-to-digital converter, a digital filter, a digitally controlled oscillator, and a frequency divider.

The time-to-digital converter and the digital filter receive the first open-loop control signal, and are configured to stop working based on the first open-loop control signal, and keep a value that is before reception of the first open-loop control signal continuing to be output.

The digitally controlled oscillator keeps an oscillation signal that is before an open-loop state continuing to be oscillated to output the first clock signal.

The frequency divider receives the first clock signal, and performs frequency division on the first clock signal, to reduce a frequency of the first clock signal to be equal to or close to the frequency of the field clock signal recovered by the clock extractor.

In this embodiment, the open-loop control method further includes, when load modulation is active load modulation, the digital baseband chip of the NFC apparatus generates a second open-loop control signal when outputting the second carrier signal to the NFC card reader.

A MUX of the controller selectively performs open-loop control on the digital phase-locked loop based on at least one of the first open-loop control signal and the second open-loop control signal.

It is clear that, the method may further have another variation. For details, refer to the descriptions of the NFC apparatus. Details are not described herein again.

Finally, it should be noted that the foregoing embodiments are merely intended for describing the technical solutions of this application, but not for limiting the technical solutions of this application. Although this application is described in detail with reference to the preferred embodiments, a person of ordinary skill in the art should understand that modifications or equivalent replacements may be made to the technical solutions of this application, without departing from the spirit and scope of the technical solutions of this application.

What is claimed is:

1. A near-field communication (NFC) apparatus, comprising:
- a clock extractor configured to perform clock recovery based on a first carrier signal from an NFC card reader to obtain a field clock signal;
- a digital phase-locked loop configured to perform frequency tracking on the field clock signal to output a first clock signal;
- a digital baseband chip configured to perform load modulation based on the first clock signal to generate a second carrier signal; and
- a controller, configured to:
  - receive the first clock signal from the digital phase-locked loop;
  - perform frequency multiplication on the first clock signal to obtain a second clock signal;
  - sample the field clock signal using the second clock signal to obtain a sampling result;
  - detect a frequency of the field clock signal or a phase of the field clock signal based on the sampling result to obtain a frequency detection result or a phase detection result; and
  - selectively perform open-loop control on the digital phase-locked loop based on the frequency detection result or the phase detection result.

2. The NFC apparatus of claim 1, wherein the controller is further configured to:
- perform closed-loop control on the digital phase-locked loop when the frequency detection result or the phase detection result has no deviation; or
- generate a first open-loop control signal when the frequency detection result or the phase detection result has the deviation and perform the open-loop control on the digital phase-locked loop using the first open-loop control signal.

3. The NFC apparatus of claim 2, wherein the controller comprises:
- a frequency multiplier configured to:
  - perform the frequency multiplication on the first clock signal to output the second clock signal; and
  - send the second clock signal;
- a processor configured to:
  - receive the second clock signal;
  - determine a first quantity of high-frequency clocks in the second clock signal;
  - determine the sampling result using the field clock signal; and
  - further detect the frequency of the field clock signal or the phase of the field clock signal based on the sampling result, wherein the sampling result is a second quantity of high-frequency clocks in a clock cycle of the field clock signal, wherein the frequency of the field clock signal or the phase of the field clock signal has the deviation and the frequency of the field clock signal or the phase detection result is a first voltage level when the second quantity of high-frequency clocks has the deviation; and
- a digital circuit configured to:
- receive the frequency detection result or the phase detection result; and
  - further generate the first open-loop control signal based on the frequency detection result or the phase detection result.

4. The NFC apparatus of claim 3, wherein the processor comprises:
- a counter configured to:
  - receive the second clock signal;
  - record the first quantity of high-frequency clocks in the second clock signal;
  - send the first quantity of high-frequency clocks; and
  - send a third quantity of high-frequency clocks in a previous clock cycle; and
- a digital signal processor configured to:
  - receive the third quantity of high-frequency clocks in the previous clock cycle;
  - obtain the second quantity of high-frequency clocks in a current clock cycle of the field clock signal; and
  - determine a fourth quantity of high-frequency clocks in the current clock cycle based on the second quantity of high-frequency clocks and the third quantity of high-frequency clocks.

5. The NFC apparatus of claim 4, wherein the digital signal processor is further configured to:
- compare the fourth quantity of high-frequency clocks in the current clock cycle with a preset range to obtain a comparison result;
- determine, using the comparison result, whether the second quantity of high-frequency clocks in the current clock cycle of the field clock signal has the deviation; and
- determine whether the frequency or the phase has the deviation, wherein the preset range corresponds to the second clock signal, and wherein the second quantity of high-frequency clocks in the current clock cycle of the field clock signal has the deviation and the frequency or the phase has the deviation when the fourth quantity of high-frequency clocks in the current clock cycle is not within the preset range.

6. The NFC apparatus of claim 2, wherein the controller is further configured to:
- receive the first carrier signal;
- detect an amplitude of the first carrier signal; and
- further perform the closed-loop control on the digital phase-locked loop when the amplitude of the first carrier signal is greater than a preset value.

7. The NFC apparatus of claim 6, wherein the controller comprises:
- an amplitude detection circuit configured to:
  - receive the first carrier signal;
  - detect the amplitude; and
  - generate an amplitude detection result based on the amplitude, wherein the amplitude detection result is a second voltage level when the amplitude is greater than the preset value;

a delay circuit configured to:
delay outputting the amplitude detection result for a preset time; and
output the amplitude detection result after the delay; and
a digital circuit configured to:
receive the amplitude detection result; and
further perform the closed-loop control on the digital phase-locked loop based on the amplitude detection result.

8. The NFC apparatus of claim 2, wherein the digital phase-locked loop comprises:
a time-to-digital converter configured to:
receive the first open-loop control signal;
stop obtaining a first value based on the first open-loop control signal; and
keep a second value that is obtained before receiving the first open-loop control signal;
a digital filter configured to:
receive the first open-loop control signal;
stop obtaining the first value based on the first open-loop control signal; and
keep the second value before receiving the first open-loop control signal;
a digitally controlled oscillator configured to:
maintain an oscillation signal that is received before an open-loop state to be oscillating; and
output the first clock signal; and
a frequency divider configured to:
receive the first clock signal; and
perform frequency division on the first clock signal to reduce the frequency of the first clock signal to be equal to or close to the frequency that is recovered by the clock extractor.

9. The NFC apparatus of claim 2, wherein the load modulation is an active load modulation, wherein the digital baseband chip is further configured to generate a second open-loop control signal to output the second carrier signal, and wherein the controller further comprises a multiplexer (MUX) configured to selectively perform the open-loop control on the digital phase-locked loop based on at least one of the first open-loop control signal or the second open-loop control signal.

10. The NFC apparatus of claim 1, wherein the controller is further configured to determine a modulation depth of the first carrier signal based on the frequency detection result or the phase detection result.

11. A method, comprising:
receiving, by a clock extractor of a near field communication (NFC) apparatus, a first carrier signal from an NFC card reader;
performing, by the clock extractor, clock recovery based on the first carrier signal to obtain a field clock signal;
performing, by a digital phase-locked loop of the NFC apparatus, frequency tracking on the field clock signal to output a first clock signal;
performing, by a digital baseband chip of the NFC apparatus, load modulation based on the first clock signal to generate a second carrier signal;
receiving, by a controller of the NFC apparatus, the first clock signal from the digital phase-locked loop;
performing, by the controller, frequency multiplication on the first clock signal to obtain a second clock signal;
sampling, by the controller, the field clock signal using the second clock signal to obtain a sampling result;
detecting, by the controller, a frequency of the field clock signal or a phase of the field clock signal based on the sampling result to obtain a frequency detection result or a phase detection result; and
selectively controlling, by the controller, the digital phase-locked loop based on the frequency detection result or the phase detection result.

12. The method of claim 11, wherein the method further comprises:
performing, by the controller, closed-loop control on the digital phase-locked loop when the frequency detection result or the phase detection result has no deviation; or
generating, by the controller, a first open-loop control signal when the frequency of the field clock signal or the phase of the field clock signal has the deviation and performing, by the controller using the first open-loop control signal, open-loop control on the digital phase-locked loop.

13. The method of claim 12, further comprising:
obtaining, by a frequency multiplier of the controller, the second clock signal based on the frequency multiplication on the first clock signal;
determining, by a processor of the controller, a first quantity of high-frequency clocks in the second clock signal;
determining, by the processor, the sampling result using the field clock signal;
further detecting, by the processor, the frequency of the field clock signal or the phase of the field clock signal based on the sampling result to obtain a frequency detection result of a first voltage level or a phase detection result of the first voltage level, wherein the sampling result is a second quantity of high-frequency clocks in a clock cycle of the field clock signal, wherein the frequency or the phase has the deviation and the frequency detection result or the phase detection result is the first voltage level when the second quantity of high-frequency clocks has the deviation; and
generating, by a digital circuit of the controller, the first open-loop control signal based on the frequency or the phase detection result of the first voltage level.

14. The method of claim 13, further comprising:
receiving, by a counter of the processor, the second clock signal;
recording, by the counter, the first quantity of high-frequency clocks in the second clock signal;
sending, by the counter, the first quantity of high-frequency clocks in the second clock signal and a third quantity of high-frequency clocks in a previous clock cycle;
receiving, by a digital signal processor of the processor, the first quantity of high-frequency clocks in the second clock signal and the third quantity of high-frequency clocks in the previous clock cycle;
obtaining, by the digital signal processor of the processor, the second quantity of high-frequency clocks in a current clock cycle of the field clock signal; and
determining, by the digital signal processor, a fourth quantity of high-frequency clocks in the current clock cycle based on the second quantity of high-frequency clocks and the third quantity of high-frequency clocks obtained in the previous clock cycle.

15. The method of claim 14, wherein detecting, by the processor, the frequency or the phase based on the sampling result comprises:
comparing, by the digital signal processor, the fourth quantity of high-frequency clocks in the current clock cycle with a preset range to obtain a comparison result; and determining, by the digital signal processor, whether the second quantity of high-frequency clocks in the current clock cycle of the field clock signal has the deviation, and whether the frequency or the phase of the field clock signal has the deviation based on the comparison result, wherein the preset range corresponds to the second clock signal, and wherein the second quantity of high-frequency clocks in the current clock cycle of the field clock signal has the deviation and the frequency or the phase has the deviation when the fourth quantity of high-frequency clocks in the current clock cycle is not within the preset range.

16. The method of claim 12, further comprising:

receiving, by the controller, the first carrier signal;

detecting, by the controller, an amplitude of the first carrier signal; and performing, by the controller, the closed-loop control on the digital phase-locked loop when the amplitude of the first carrier signal is greater than a preset value.

17. The method of claim 16, further comprising:

receiving, by an amplitude detection circuit of the controller, the first carrier signal;

detecting, by the amplitude detection circuit, the amplitude of the first carrier signal;

generating, by the amplitude detection circuit, an amplitude detection result based on the amplitude, wherein the amplitude detection result is a second voltage level when the amplitude is greater than the preset value;

delaying, by a delay circuit of the controller, outputting the amplitude detection result for a preset time to output the amplitude detection result;

outputting, by the delay circuit, the amplitude detection result after delaying the outputting;

receiving, by a digital circuit of the controller, the amplitude detection result; and further performing, by the digital circuit, the closed-loop control on the digital phase-locked loop based on the amplitude detection result.

18. The method of claim 12, wherein the load modulation is active load modulation, and wherein the method further comprises:

generating, by the digital baseband chip, a second open-loop control signal to output the second carrier signal to the NFC card reader; and selectively performing, by a multiplexer (MUX) of the controller, open-loop control on the digital phase-locked loop based on at least one of the first open-loop control signal or the second open-loop control signal.

19. The method of claim 12, further comprising:

receiving, by a frequency divider of the digital phase-locked loop, the first clock signal; and performing, by the frequency divider, frequency division on the first clock signal to reduce the frequency of the first clock signal to be equal to or close to the frequency that is recovered by the clock extractor.

20. The method of claim 11, further comprising determining, by the controller, a modulation depth of the first carrier signal based on the frequency detection result or the phase detection result.

* * * * *